Patented July 18, 1944

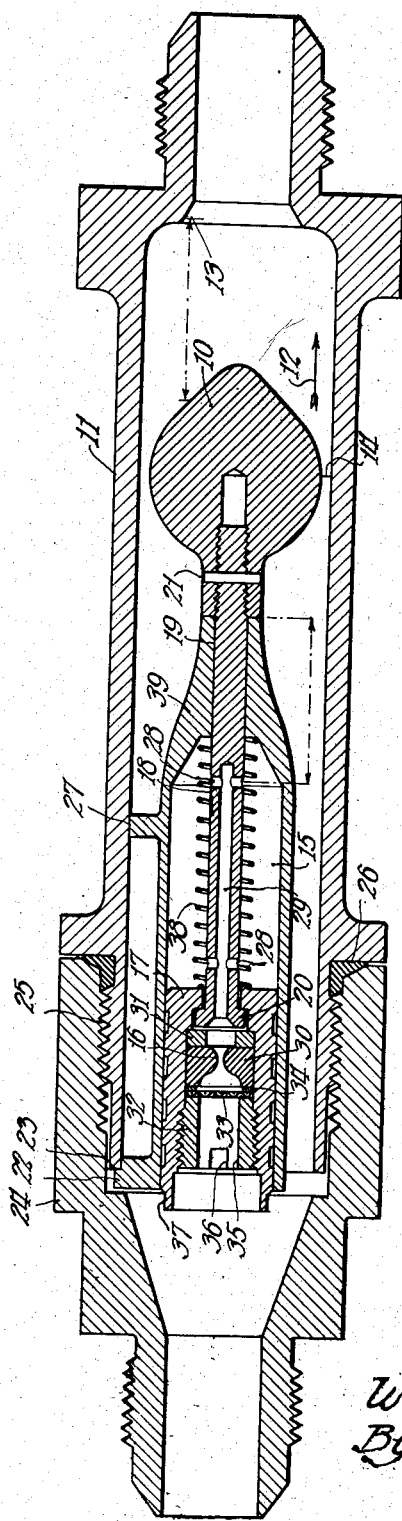

2,354,161

UNITED STATES PATENT OFFICE 2,354,161

AUTOMATIC CUTOFF DEVICE

William Waterman, Chicago, Ill.

Application February 8, 1943, Serial No. 475,140

11 Claims. (Cl. 137—153)

This invention relates to automatic cut-off devices, and among other objects aims to provide improved devices for automatically restricting or cutting off fluid flow under predetermined conditions.

The nature of the invention may be readily understood by reference to an illustrative device embodying the invention and shown in the accompanying drawing.

In said drawing, the figure is a longitudinal section of the device.

The illustrative device is normally open to flow, but is designed automatically to cut off flow in a line or the like under predetermined (usually abnormal) conditions. In aircraft, for example, the device prevents dumping of hydraulic fluid if a line be punctured or broken by gun fire or by any other cause. In the present case the condition determining operation of the device is an abnormal volume of flow, independently of rate of flow or of viscosity of the fluid.

Most instrumentalities operated by hydraulic pressure fluid employ a specific limited volume of liquid for their operation. In aircraft, for example, wing and tail flaps, wheel retracting gears, etc., are operated by a hydraulic piston and cylinder requiring a limited volume of pressure liquid for their operation. When high pressure systems are used (as in the case of aircraft to reduce weight), the volume of liquid required for such operation is relatively small. The present device is adjusted to permit flow of the required volume (with some excess if desired as a safety factor), but to close if this volume be exceeded, as would be the case if the line were broken.

Insensitiveness to variation in rate of flow and viscosity and insensitiveness to pressure changes due to variation in viscosity are important. For example, surges in a line caused by presence of air may result in abnormally high rate of flow, though of course the volume of such flow is generally very small. Operation of the automatic cut-off must therefore not be influenced by variations in rate of flow. Variations in viscosity, particularly in oil (the liquid used in most hydraulic lines) cause great differences in the pressure required to produce a given rate of flow. This variation is extreme in aircraft which are subject to exceedingly wide temperature ranges, e. g. —40° F. to 160° F., within which range oil viscosity varies from 50 S. S. U. (at 160° F.) to about 25,000 S. S. U. (at —40° F.).

In the present device, the controlling element, here represented by the valve 10, is directly exposed to the force of the flowing liquid travelling inside housing 11 in the direction of arrow 12 and tending to move the valve toward its seat 13 and in this instance to close the line on seating. Closing of the valve is prevented under normal conditions by restraining means in the form of a metering device which counteracts the valve closing force and delays closing until a predetermined volume of liquid has passed through the line. The clearance 14 between valve 10 and housing 11 is great enough not unduly to restrict flow, but the clearance may vary if necessary (by use of a different sized valve as presently explained in greater detail) to adjust the valve closing force.

The metering device operates to delay closing of the valve inversely as the rate of flow. As here shown closing movement of the valve operates to displace liquid from cylinder 15 through an adjustable orifice 16. In the present case the orifice is carried in the piston or plunger 17, the latter being connected with valve 10 by plunger rod 18.

Preferably the connection of plunger 17 to rod 18 allows some play to avoid the necessity of fabrication to absolute concentricity between the bore of cylinder 15 and that of the plunger rod bore 19, and also between the plunger 17 and the rod 18. In this case rod 18 is provided with a head 20 which loosely fits in a socket inside plunger 17. Valve 10 is connected to the end of rod 18 by a pin 21. Cylinder 15 is held within the housing 11 by a series of projecting arms 22 (spaced so as to allow free travel of fluid between them) which fit against the end 23 of the housing in which position the cylinder is held by the fitting 24 screw threaded to the housing as at 25. A gasket 26 seals the connection. The cylinder is further centered in the housing by radial arms 27 located adjacent the other end of the cylinder.

Liquid enters and leaves cylinder 15 through ports 28 and bore 29 within the plunger 18, the bore being in communication with orifice 16. At least one of the orifices 28 (the right hand pair in this case) is so located in plunger rod 18 that it clears the end of plunger rod bore 19 in cylinder 15 before valve 10 reaches its seat. When this occurs further restraint on valve 10 is released and the latter may close quickly to avoid the throttling or wire drawing which would otherwise occur.

The orifice 16 may be made adjustable by means of a needle valve or, as in the present case, by making the member 30 carrying the orifice removable and interchangeable with a similar member having an orifice of different design. The orifice member is in this instance made of a suitable plastic and is tightly seated inside the plunger against a washer 31 by means of a screw plug 32. Preferably a wire mesh filter 33 is interposed in the fluid passage to prevent solid particles from reaching and possibly clogging the orifice. A seal 34 of neoprene or other suitable material prevents leakage around the filter screen. Plug 32 is formed hollow as at 35 to provide a liquid passage and is slotted at 36 to receive a screw driver or similar tool. Plunger 17 is preferably provided with a hexagonal or non-circular extremity 37 to receive a wrench for holding it for insertion and removal of plug 32.

The force exerted by the travelling liquid on valve 10 advances plunger 17 and displaces fluid from cylinder 15 through orifice 16. The valve closes on its seat when the fluid has been substantially discharged from cylinder 15, being released just prior to closing as aforesaid. A light spring 38 counteracts the force of gravity on the valve if it be in a vertical position. The spring as well as friction modify the theoretical operation of the valve since it would permit unlimited flow at very low velocities or velocities below a predetermined minimum. In actual practice, however, normal velocities are so much greater than this predetermined minimum that the effects of the spring and friction can be ignored. While the spring tends also to open the valve when flow ceases, it is not necessary for this purpose since the valve will be opened by reverse flow. On opening the valve, liquid re-enters the cylinder 15 through orifice 16.

To give the desired operating characteristics stated above the ratio of the rate of flow of liquid past valve 10 to the rate of discharge through orifice 16 must be substantially constant in which event operation of the device will be substantially insensitive to variations in viscosity or rate of flow. Increase in viscosity increases the closing force on valve 10; however, it also increases the resistance to discharge through orifice 16. When the valve 10 together with the exterior 39 of the end of the cylinder adjacent the valve is appropriately streamlined, the closing force on the valve 10 varies as the square of the velocity of the fluid through the housing, that is, $$F = CV^2$$

wherein F represents the closing force, V, the velocity of the fluid and C a constant.

However the force required to discharge liquid from cylinder 15 depends on the shape of the discharge orifice. For a generally circular orifice, the resisting force (which is the same as the closing force since it counter-balances it) varies as the square of the discharge velocity, that is, $$F = Ev^2$$

wherein F is the closing or resisting force, $v$ the velocity of discharge, and E a constant. However, if the orifice be very narrow in relation to its circumference as where it is a narrow slit such as would characterize escape of the oil past piston 17, the escape velocity is a linear function of the resisting force F, that is, $$F = Dv$$

wherein D is a constant.
Transposing:
In all cases, $$V = \sqrt{\frac{F}{C}}$$

In all cases for discharge of oil through a circular orifice, $$v = \sqrt{\frac{F}{E}}$$

For discharge through a narrow or "slit" orifice, $$v = \frac{F}{D}$$

Conditions for insensitiveness to variations in rate of flow and viscosity require that the ratio $$\frac{V}{v}$$

must be a constant. Accordingly, for discharge through a round orifice $$\frac{V}{v} = \frac{\sqrt{\frac{F}{C}}}{\sqrt{\frac{F}{E}}} = \sqrt{\frac{E}{C}}$$

which is a constant for it contains no variables. On the other hand, in the case of a "slit" orifice where there is a large perimeter in relation to the orifice area $$\frac{V}{v} = \frac{\sqrt{\frac{F}{C}}}{\frac{F}{D}} = D\sqrt{\frac{1}{CF}}$$

This can never be a constant because it is a function of F, that is the force on the valve, which varies with the velocity and viscosity of the fluid.

The laws governing viscosity are similar. For example, $$F = CxV^2$$

wherein $x$ is a variable depending on viscosity. For discharge from the metering device through a circular orifice, $$F = Eyv^2$$

wherein $y$ is a variable depending on viscosity. Tests of the device have demonstrated that under these conditions $x$ substantially equals $y$, in which case the device is substantially insensitive to variation in viscosity. However, when discharging from the metering device through a "slit" shaped orifice as by discharging around the piston 17, $x$ is very much less than $y$.

Therefore, if the device is to be substantially insensitive to variation in viscosity and rate of flow, the discharge orifice on the metering device should be circular in section. If, on the other hand, it be desired that the operation follow some other law, proper regulation may be effected either by changing the shape of the orifice or by permitting a certain percentage of the liquid in cylinder 15 to escape around the piston as well as through a round or nearly round orifice. It should be understood that the term "orifice" is intended to include all openings or spaces through which fluid escapes from cylinder 15.

By adjusting the size of orifice 16 (as by employing an appropriate orifice plug 30) the device may be adjusted to varying volumes of flow so as to close in the event a specific volume of flow in a given line is exceeded. Further regulation may be effected as stated above by varying the clearance 14 which varies the closing force on the valve and also by varying the contour of the valve and the streamlining around the surface 39. Ordinarily variation in valve contour and contour of the surface 39 is not required since adequate regulation may be effected simply by proper adjustment of the metering orifice. Preferably the valve surface and surface 39 should be efficiently streamlined so as to minimize turbulence in the fluid as it travels through the housing.

This application is a continuation in part of my co-pending application Serial No. 452,991, filed July 31, 1942.

Obviously the invention is not limited to the details of the illustrative device since these may be variously modified. Moreover, it is not indispensable that all features of the invention be used conjointly since various features of the invention may be used to advantage in different combinations and sub-combinations.

Having described my invention, I claim:

1. An automatic cut-off device for a fluid line comprising in combination a valve housing, a normally open valve movable by fluid flow to close the passage through said housing, and brake means including a fluid flow passage so designed with relation to the flow characteristics of the valve as to resist closing of the valve and operative to permit closing of the valve on passage of a substantially predetermined volume of fluid at velocities exceeding a predetermined minimum.

2. An automatic cut-off device for a fluid line comprising in combination a valve housing, a normally open valve movable by fluid flow to close the passage through said housing, brake means including a fluid flow passage so designed with relation to the flow characteristics of the valve as to resist closing of the valve and operative to permit closing of the valve on passage of a substantially predetermined volume of fluid at velocities exceeding a predetermined minimum, and means for releasing from the valve the resistance of the brake just prior to engagement of the valve with its seat.

3. An automatic cut-off device for a fluid line comprising in combination a valve housing, a normally open valve movable by fluid flow to close the passage through said housing, and brake means including a fluid flow passage member so designed with relation to the flow characteristics of the valve as to resist closing of the valve and operative to permit closing of the valve on passage of a substantially predetermined volume of fluid at velocities exceeding a predetermined minimum, said member being removable so that it can be replaced by one of different size or shape.

4. An automatic valve for a fluid line comprising in combination a valve housing having a valve seat, a normally open valve movable by fluid flow toward said seat, and brake means including a fluid flow passage so designed with relation to the velocity characteristics of the valve as to resist seating of the valve and operative to permit seating of the valve on passage of a substantially predetermined volume of fluid at velocities exceeding a predetermined minimum.

5. An automatic valve for a fluid line comprising in combination a valve housing having a valve seat, a normally open valve movable by fluid flow toward said seat, and brake means including a fluid flow passage so designed with relation to the viscosity characteristics of the valve as to resist seating of the valve and operative to permit seating of the valve on passage of a substantially predetermined volume of fluid at velocities exceeding a predetermined minimum.

6. An automatic valve for hydraulic systems comprising in combination a housing through which liquid flows having a valve seat, a valve inside said housing movable by the liquid toward said seat, a brake cylinder and piston connected to said valve and extending lengthwise of the passage inside said housing and being surrounded by the flowing liquid, said cylinder being connected to the housing so that closing movement of the valve causes movement of the piston in the cylinder to displace liquid in the latter, and means including an orifice which permits liquid in said housing to flow into and out of said cylinder for retarding seating of said valve, said orifice and valve shapes being so designed that sufficient liquid in the cylinder will be discharged therefrom to permit the valve to seat in the time required for a predetermined volume of liquid to pass through the housing at velocities exceeding a predetermined minimum.

7. An automatic valve for a hydraulic line comprising in combination a housing having terminal connections to adapt it for connection into and to form a part of the main line, and having a valve seat, a valve inside said housing surrounded by the liquid and pulled by the flowing liquid toward said seat, a brake cylinder and piston connected to said valve and extending lengthwise of the passage inside said housing and being surrounded by the flowing liquid, said cylinder and piston being connected to the housing and valve so that seating movement of the valve causes movement of the piston in the cylinder to displace liquid in the latter, and means including an orifice which permits liquid in said housing to flow into and out of said cylinder for retarding seating of said valve, said orifice and valve shapes being so designed that sufficient liquid in the cylinder will be discharged therefrom to permit the valve to seat in the time required for a predetermined volume of liquid to pass through the housing at velocities exceeding a predetermined minimum, said orifice being of such shape that increase in resistance to escape of liquid due to increase in viscosity thereof is substantially proportional to the increase in resistance to flow of liquid past the valve and vice versa, whereby the effect on the seating movement of the valve of variations in viscosity of the liquid is minimized.

8. An automatic valve device comprising in combination a valve housing having a valve seat, a normally open valve movable by the flowing liquid toward said seat, said valve having extending longitudinally from it a piston and piston rod, a cylinder of smaller diameter than the passage in said housing surrounded by the flowing liquid in said passage, said cylinder being anchored in said housing against movement with the liquid, said piston being inside said cylinder and having its rod extending through the end of said cylinder, a replaceable member having an escape orifice for said cylinder designed to regulate the escape of liquid therefrom on seating movement of the valve to cause complete seating of said valve to be responsive to the passage of a predetermined volume of liquid through the housing at velocities exceeding a predetermined minimum.

9. An automatic cut-off device comprising in combination a valve housing, a normally open valve movable by the flowing liquid to close the passage through said valve, said valve having extending longitudinally from it a piston and piston rod, a cylinder of smaller diameter than the passage in said housing surrounded by the flowing liquid in said passage, said cylinder being anchored in said housing against movement with the liquid, said piston being inside said cylinder and having its rod extending through the end of said cylinder, a member having an escape orifice for said cylinder to regulate the escape of liquid therefrom on closing movement of the valve to cause complete closing of said valve to be responsive to the passage of a predetermined volume of liquid through the housing at velocities exceeding a predetermined minimum, said escape orifice being of such shape that the increase in resistance to escape of liquid due to increase in viscosity thereof is substantially proportional to the increase in resistance to flow of liquid past the valve and vice versa, whereby the effect on the closing movement of the valve of variations in viscosity is minimized.

10. An automatic metering and cut-off valve for a hydraulic line comprising in combination a valve housing forming a fluid passage interposed in and constituting a part of said line, a normally open valve exposed to the flow of fluid in said passage and movable by the fluid to close said passage, a brake cylinder and piston in said passage to cause closing of the valve to be responsive to flow of a predetermined volume of liquid past the valve at velocities exceeding a predetermined minimum, and means including an escape orifice for said cylinder to compensate for the effect of variations in viscosity of the fluid on the closing movement of the valve, said escape orifice being of such shape that the increase in resistance to escape of fluid due to increase in viscosity thereof is substantially proportional to the increase in resistance to flow of fluid past the valve and vice versa, whereby the effect on the closing movement of the valve of variations in viscosity is minimized.

11. An automatic metering and cut-off valve for a hydraulic line comprising in combination a valve housing forming a fluid passage interposed in and constituting a part of said line, a normally open valve exposed to the flow of fluid in said passage and movable by the fluid to close said passage, a brake cylinder and piston in said passage to cause closing of the valve to be responsive to flow of a predetermined volume of liquid past the valve at velocities exceeding a predetermined minimum, means including an escape orifice for said cylinder to compensate for the effect of variations in viscosity of the fluid on the closing movement of the valve, said escape orifice being of such shape that the increase in resistance to escape of fluid due to increase in viscosity thereof is substantially proportional to the increase in resistance to flow of fluid past the valve and vice versa, whereby the effect on the closing movement of the valve of variations in viscosity in minimized, and a port uncovered by predetermined closing movement of the valve to release said hydraulic brake to permit the valve to close freely.

WILLIAM WATERMAN.